United States Patent [19]
Frazer

[11] Patent Number: 4,807,529
[45] Date of Patent: Feb. 28, 1989

[54] HOT GAS CONTROL SYSTEM
[75] Inventor: Alson C. Frazer, Santa Ana, Calif.
[73] Assignee: Ford Aerospace & Communications Corporation, Detroit, Mich.
[21] Appl. No.: 118,375
[22] Filed: Nov. 6, 1987
[51] Int. Cl.[4] .................................... C06B 45/00
[52] U.S. Cl. ..................... 102/285; 244/3.22; 102/530
[58] Field of Search ............. 102/285, 286, 287, 291, 102/530; 244/3.21, 3.22; 280/736, 741; 60/253

[56] References Cited
U.S. PATENT DOCUMENTS

| | | | |
|---|---|---|---|
| 3,147,710 | 9/1964 | Gluckstein | 102/202 |
| 3,165,060 | 1/1965 | Braun et al. | 102/287 |
| 3,217,651 | 11/1965 | Braun et al. | 102/287 |
| 3,427,805 | 2/1969 | Osburn | 102/289 |
| 3,668,872 | 6/1972 | Camp et al. | 60/253 |
| 4,042,667 | 8/1977 | Ishiwata et al. | 55/71 |
| 4,248,616 | 2/1981 | Seng et al. | 55/99 |
| 4,466,352 | 8/1984 | Dalet et al. | 102/288 |
| 4,574,700 | 3/1986 | Lewis | 102/287 |
| 4,594,945 | 6/1986 | Alexandris | 102/287 |
| 4,627,352 | 12/1986 | Brachert et al. | 102/290 |

Primary Examiner—Deborah L. Kyle
Assistant Examiner—Michael J. Carone
Attorney, Agent, or Firm—Edward J. Radlo; Harry G. Weissenberger; Keith L. Zerschling

[57] ABSTRACT

A hot gas control system includes a pressure vessel defining a chamber in which is disposed a body of solid propellant material that has a leading portion and a trailing portion. A first layer of the body of solid propellant material extends between the leading portion and an intermediate region of the body of solid propellant material, and a second layer extends between the intermediate region and the trailing portion of the body of solid propellant material. The first layer is composed of a first propellant composition that produces a relatively clean gas, and the second layer is composed of a second propellant composition that produces a relatively less clean gas. The body of solid propellant is arranged to burn within the chamber from the leading portion toward the trailing portion and thereby produce a quantity of gas that passes through an outlet port to a ducting path, the first layer having a thickness sufficient to produce enough relatively clean gas to preheat the ducting structure and thereby inhibit contaminant accumulation due to the withdrawal of heat from the less clean gas.

14 Claims, 1 Drawing Sheet

HOT GAS CONTROL SYSTEM

BACKGROUND OF THE INVENTION

1. Technical Field

This invention relates generally to hot gas control systems such as those utilized, e.g., in some flight control systems and the like. It concerns a hot gas control system and associated methodology that allow use of a wider range of propellant formulations by reducing contamination otherwise caused by condensible and magnetic species in the gas stream.

2. Background Information

The hot gas utilized in a hot gas control system is sometimes produced in a solid propellant gas generator that includes a pressure vessel in which is disposed a suitable solid propellant or grain. Once the propellant is ignited, hot gas flows from the vessel along a ducting path, defined by suitable ducting structure, as the hot gas is utilized in performing some function, such as controlling various guidance components. The ducting path may include very narrow passages and small orifices on the order of less than a millimeter in diameter, and so it is important to consider contaminants in the hot gas that can accumulate in the ducting path, reduce performance, and cause malfunctioning.

One contaminant of particular interest includes condensible species such as hydrochloric acid. Another contaminant includes various ferrocenes, i.e. materials having notable magnetic properties. Both contaminants are initially of no concern as the hot gas leaves the vessel because the condensible species are in a gaseous state and the temperature of the ferrocenes is typically above the Curie temperature so that their magnetic properties are nil. However, both contaminants can cause severe problems if they are cooled as they pass along the unheated ducting path.

As the ducting structure is (at least initially) at a significantly lower temperature than the hot gas, heat is withdrawn from the gas stream, which can result in the condensible species being transformed to the liquid or solid state and the ferrocenes becoming magnetic as they drop below their Curie temperature. Such events can result in system clogging, and thus lead to system failure or reduction in performance. The deleterious effect essence of magnetic particles is further aggravated when the control system is of the type which employs magnetic drivers.

Thus, these contaminants must be avoided when choosing the propellant to be used, which significantly limits the number of available propellant choices. Generally, the propellant must be such as to produce a "clean" gas in the sense that the level of contaminants is low enough that the risk of blockage is acceptably low, i.e. the level is virtually nil in practice. When this requirement is combined with the desire for high energy content, burning rate and pressure relationships, temperature, and density, the choices of propellant candidates are severely restricted.

Consequently, if a method or technique could be devised that permits use of propellants which have improved operational properties but contain condensible and/or magnetic constituents, system design and performance advantages could be realized.

Prior art in this field includes U.S. Pat. No. 3,147,710 to Gluckstein which relates to solid propellant compositions and to a method of igniting solid propellant rocket motors.

U.S. Pat. Nos. 3,165,060 and 3,217,651 to Braun, et al. describe multiple propellent grain for rocket motors, and U.S. Pat. No. 3,427,805 to Osburn describes a combustion barrier embedded within the grain for varying the burning pattern.

U.S. Pat. No. 3,668,872 to Camp, et al. describes a method and apparatus for utilizing the volatility of the combustion products of solid metallic propellants to accelerate metal combustion products to gaseous velocity by recondensing the gaseous products in the rocket envelope behind the throat of the nozzle.

U.S. Pat. No. 4,466,352 to Dalet, et al. describes a propellant that burns in at least two thrust modes, one providing an acceleration phase and the other a cruising phase.

U.S. Pat. No. 4,574,700 to Lewis describes a solid propellant grain having a main portion and a nozzle portion. The nozzle portion is a shaped and cured propellant having a lower burn rate and a plurality of aromatic amide fibers dispersed therethrough.

U.S. Pat. No. 4,594,945 to Alexandris describes a thermal protection for propellant grains, and U.S. Pat. No. 4,627,352 to Brachert, et al. describes a multi-base powder charge for propellants. Thus, none of these patents addresses a solution to a problem that is unique to warm or hot gas pneumatic control systems of the type described.

SUMMARY OF THE INVENTION

This invention solves the problems associated with the prior art by preheating the ducting structure in order to inhibit the contaminant cooling that causes the undesired accumulation. Preheating is accomplished with a multilayer propellant having a first or "start-up" layer that meets the cleanliness criteria. This layer burns sufficiently long to preheat the system, and then a second, more energetic but "non-clean" layer of the propellant burns. This arrangement provides to the designer a far greater latitude in propellant selection.

Generally, a control system constructed according to the invention includes a pressure vessel and a body of propellant material. The pressure vessel defines a chamber and an output port in gaseous communication with the chamber, and the body of propellant material is disposed within the chamber along a burn path. These elements may, in many respects, be conventionally configured.

However, according to a major aspect of the invention, the body of solid propellant material is multilayered. A first layer extends along the burn path between a leading portion (the first to burn) and an intermediate region of the body of solid propellant material. This layer is composed of a first propellant composition that produces a relatively clean gas.

A second layer extends between the intermediate region and a trailing portion of the body of solid propellant material (the last to burn). This layer is composed of a second propellant composition that produces a relatively less clean gas. The relatively clean gas preheats the control system hardware before the relatively less clean gas is produced.

In other words, the second layer produces less clean gas when it becomes exposed, but this occurs after preheating so that the less clean gas does not damage or compromise the system operation. Thus, the method of the invention proceeds by first producing a relatively clean gas to preheat the ducting structure, and then producing a relatively less clean but more energetic gas after the ducting structure has been preheated.

DESCRIPTION OF THE PREFERRED EMBODIMENTS

Figure 1:
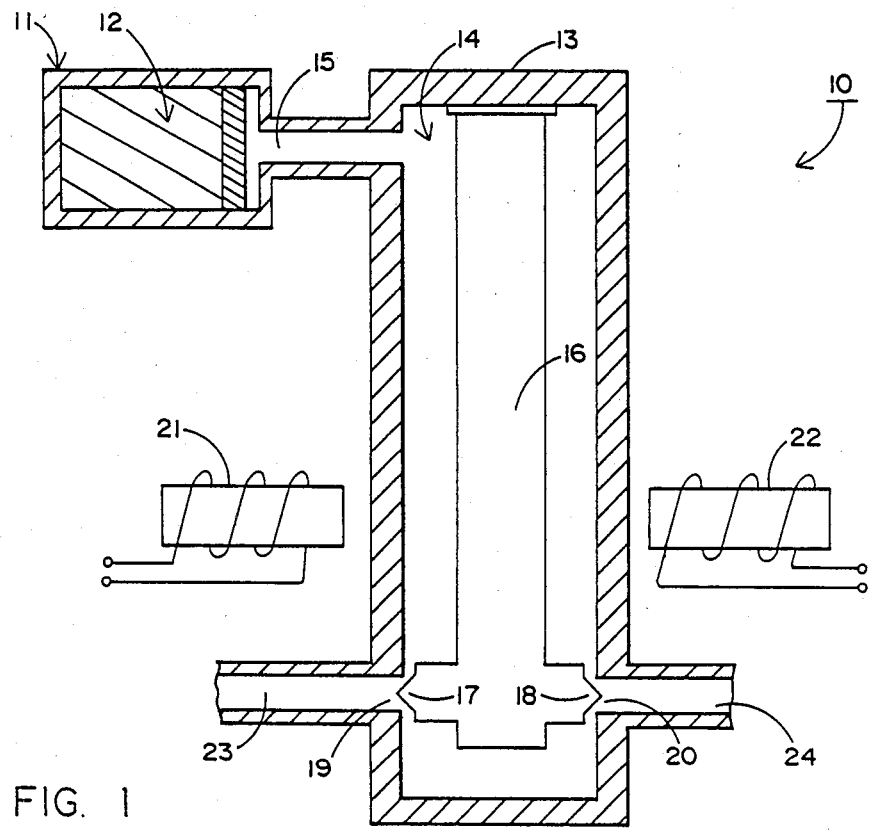
FIG. 1 is a diagrammatic representation of a control system constructed according to the invention that employs a multilayer body of propellant material.

Referring now to FIG. 1, there is shown a diagrammatic view of a hot gas control system 10 constructed according to the invention. Generally, the system 10 includes a solid propellant gas generator or pressure vessel 11 in which is disposed a body 12 of solid propellant material. In addition, the system 10 includes a ducting structure 13 that defines a passage or ducting path 14 through which hot gas is conventionally conveyed from the pressure vessel 11 for control purposes. The propellant is ignited with a conventional ignition system (not shown), and as it burns it produces hot as which flows under pressure (10,000 pounds-per-square-inch, for example) through an output port 15 in the pressure vessel 11 to the ducting path 14.

The ducting structure and flexure design may take any of various forms. The illustrated ducting structure 13 is typical, and it includes a poppet valve arrangement with a steel flexure member 16. The flexure member 16 may be approximately twenty centimeters long for some applications, and it includes a pair of valving portions 17 and 18 that are dimensioned and arranged to close respective ones of orifices 19 and 20 when the flexure member 16 is moved. Movement is accomplished by electrically activating a selected one of a pair of pole pieces 21 and 22 that are mounted in fixed proximity to the flexure member 16. Operation in this manner serves to control flow of the gas through passages 23 and 24 to a piston system (not shown) that conventionally actuates various guidance components. Activating the pole piece 21, for example, causes the flexure member 16 to move toward the orifice 19, with the valving portion 17 closing the orifice.

Although the ducting path 14 in FIG. 1 is shown out of scale for illustrative convenience, it includes regions that are typically less than a millimeter wide (such as around the orifices 19 and 20). It is here that contaminant accumulation and system blockage is most likely to occur, and this is aggravated by magnetic forces from the pole pieces 21 and 22. Contaminants can accumulate within a very short time (a matter of milliseconds) after ignition, and these can prevent satisfactory operation of the valving portions 17 and 18 by restricting the flexure freedom and/or closing the orifices 19 and 20. Of course, these problems are common to many other control system configurations, and the inventive concepts disclosed are equally applicable to them also, without regard to many particulars of the pressure vessel and ducting structure employed.

In order to solve this problem, existing control systems may employ a body of propellant material that produces a relatively clean gas. However, when restricted to "clean" gas propellants only, the selection latitude to the designer is narrowed. Other system constraints, e.g., gas temperature and flow rate, as well as the space available for the gas generator must all be included in system detailed design. In other words, various characteristics of available clean gas propellants, such as the burn rate and density, fall within a relatively narrow range compared to other available propellants. Consequently, they provide less design choices, and so the preheating technique of this invention greatly facilitates control system design by easing the clean gas requirement.

Figure 2:
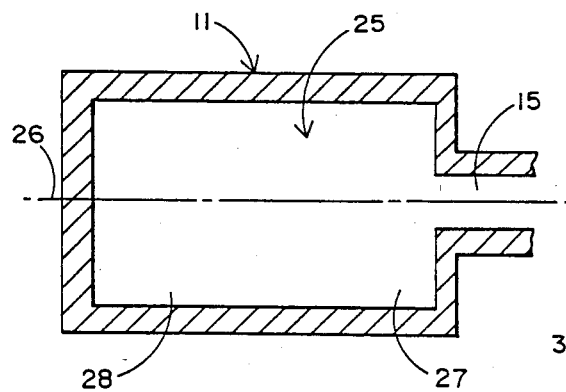
FIG. 2 is an enlarged view of the pressure vessel with the body of propellant material removed.

Considering now the pressure vessel 11 in further detail (FIG. 2), it defines a cylindrically-shaped chamber 25 that extends along a chamber axis 26 from a forward portion 27 of the chamber 25 to a rearward portion 28 of the chamber 25. The pressure vessel 11 may be conventionally fabricated from a metal alloy, and it is configured according to known design techniques to provide a chamber having a cross sectional area and total volume sufficient to contain a similarly shaped propellant which is designed to sustain a desired hot gas flow rate through the output port 15.

Of course, the chamber 25 may have any of various other shapes according to the precise application. In addition, it may be constructed in two separable pieces (not shown) so that the body 12 of propellant material can be placed within the chamber 25 and then the chamber 25 closed. There, the body 12 of propellant material burns along a burn path (the chamber axis 26 in the illustrated embodiment) from a forward portion 27 of the chamber 25 toward a rearward portion 28 to produce hot gas that passes through the output port 15 to the ducting path 14.

Figure 3:
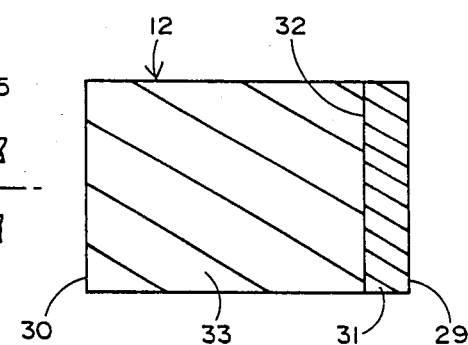
FIG. 3 is an enlarged view of the body of propellant material.

The body 12 of propellant material (FIG. 3) is dimensioned and arranged to fit within the chamber 25. It includes a forward or leading portion 29 (where the burn begins) and a rearward or trailing portion 30 (toward which the burn proceeds). When the body 12 is placed within the chamber 25 the leading portion 29 is disposed within the forward portion 27 of the chamber 25 and the trailing portion 30 is disposed within the rearward portion 28 of the chamber 25.

The body 12 includes a first layer 31 that extends between the leading portion 29 and an intermediate region 32 of the body 12. This first layer 31 is composed of a first propellant composition that produces a relatively clean gas. The body 12 also includes a second layer 33 that extends between the intermediate region 32 and the trailing portion 30 of the body 12 of solid propellant material, and the second layer 33 is composed of a second propellant composition that produces a relatively less clean gas. The relatively clean gas preheats the ducting structure 13 so that a less clean gas suffices during the remainder of the burn. Thus, the designer is afforded far greater latitude in choosing the second propellant material.

As an illustrative example only, the body 12 is fabricated in a unitary, one-piece construction with the first and second layers 31 and 33 physically bonded together at the intermediate region 32. This may be accomplished utilizing known fabrication techniques such as casting or pressing the two layers in a desired configuration. The illustrated body 12 has a generally circular cross sectional shape of generally constant area throughout its length. However, the cross sectional shape may vary within the inventive concepts disclosed, as may the cross sectional area and shape. In addition, the first and second layers 31 and 33 may join abruptly over a thin intermediate region that extends generally perpendicular to the chamber axis 26, or they may be blended together over an intermediate region of substantial thickness, all depending on the precise application and hot gas flow characteristics desired.

The first layer 31 is provided with a cross sectional area (generally perpendicular to the chamber axis) sufficient to sustain a desired hot gas flow rate. This is done according to known propellant design techniques with regard for the first propellant material's burn characteristics. The second layer 33 is also provided with a cross sectional area sufficient for this purpose, and this area may be more or less than the first layer, depending on the second propellant material's burn characteristics.

The first layer 31 is provided with a thickness (generally along the chamber axis 26) to produce enough relatively clean gas to preheat the ducting structure, and the second layer 33 is provided with a thickness sufficient to sustain the hot gas flow as long as required. In other words, the thickness of the first layer 31 is sufficient to sustain the hot gas flow rate for a preheating period of time that may be defined as a sufficient period of time for the relatively clean gas to heat the ducting structure 13 so that contaminant accumulation is reduced by the time the relatively less clean gas is produced. The preheating period of time may be less than one second, and it depends on parameters such as heat transfer characteristics of the relatively clean gas and the ducting structure 13, ambient temperature, heat transfer characteristics of the relatively less clean gas, and the level of contaminants in the less clean gas.

From another perspective, the thickness of the first layer 31 is such as to cause the ducting structure 13 to heat sufficiently to reduce contaminant accumulation otherwise resulting from the ducting structure 13 withdrawing heat from the relatively less clean gas that is produced by the second layer 33 of the body 12 of solid propellant. This thickness is determined according to known control system and propellant design techniques. In this regard, the relatively clean gas is relatively clean in the sense that the level of contaminants in the gas are low enough that contaminant accumulation is not a problem without preheating. The relatively less clean gas is relatively less clean in the sense that the level of contaminants may cause a contaminant accumulation problem (blockage or other malfunctioning of the control system) if the ducting structure 13 is not preheated.

In line with the above, the method of the invention for reducing contaminant accumulation on a hot gas control system ducting structure proceeds by producing a relatively clean gas to preheat the ducting structure. Then, a relatively less clean gas is produced after the ducting structure has been preheated. This may be accomplished by utilizing a multilayer body of propellant material (such as the body 12) to produce a relatively clean gas until the ducting structure is preheated and a relatively less clean gas after the ducting structure is preheated.

Thus, the invention solves the problems associated with the prior art by preheating the ducting structure in order to inhibit the contaminant cooling that causes the undesired accumulation. Preheating is accomplished with a novel, multilayer propellant having a forward layer that burns to produce a relatively clean gas during a preheating period, and a rearward layer that burns after the preheating period to produce a relatively less clean gas that maintains the hot gas flow rate. As a result, the preheated ducting structure withdraws less heat from the less clean gas so that contaminant accumulation is better controlled and the designer given far greater latitude in propellant selection.

Although an exemplary embodiment of the invention has been shown and described, many changes, modifications, and substitutions may be made by one having ordinary skill in the art without necessarily departing from the spirit and scope of this invention. The burn path, for example, may extend along any of various paths, including radially outwardly, all according to known propellant design techniques. All such variations in the burn path are intended to fall within the scope of the claims.

What is claimed is:

1. A gas generator for a hot-gas control system, comprising:
   (a) a pressure vessel defining a chamber and an output port; and
   (b) a body of solid propellant material disposed within the chamber, the body of solid propellant material having a leading portion, an intermediate portion, and a trailing portion;
   (c) said body of solid propellant material including a first layer that extends between said leading portion and said intermediate region of the body of solid propellant material, said first layer being composed of a first propellant composition that produces a relatively clean gas; and
   (d) said body of solid propellant material further including a second layer that extends between said intermediate region and said trailing portion of the body of solid propellant material, said second layer being composed of a second propellant composition that produces a relatively less clean gas.

2. A hot-gas control, comprising:
   (a) a pressure vessel defining a chamber and an output port; and
   (b) a body of solid propellant material disposed within the chamber, the body of solid propellant material having a leading portion, an intermediate portion, and a trailing portion;
   (c) said body of solid propellant material including a first layer that extends between said leading portion and said intermediate region of the body of solid propellant material, said first layer being composed of a first propellant composition that produces a relatively clean gas;
   (d) said body of solid propellant material further including a second layer that extends between said intermediate region and said trailing portion of the body of solid propellant material, said second layer being composed of a second propellant composition that produces a relatively less clean gas; and
   (e) a ducting structure defining a ducting path in gaseous communication with the outlet port;
   (f) said body of solid propellant being arranged to burn within the chamber from the leading portion toward the trailing portion and thereby produce a quantity of gas that passes through said outlet port to said ducting path; and
   (g) said first layer having a thickness sufficient to produce enough relatively clean ga to preheat the ducting structure.

3. A control system as recited in claim 2, wherein the thickness of said first layer is such as to cause said ducting structure to heat sufficiently to substantially prevent contaminant accumulation resulting from the ducting structure withdrawing heat from the relatively less clean gas that is produced by said second layer.

4. A control system as recited in claim 2, wherein the thickness of said first layer is such as to cause said ducting structure to heat sufficiently to substantially prevent condensation of condensible species resulting from the ducting structure withdrawing heat from the relatively less clean gas that is produced by said second layer.

5. A control system as recited in claim 2, wherein the thickness of the first layer is such as to cause the ducting structure to heat sufficiently to substantially prevent accumulation of ferrocenes resulting from the ducting structure withdrawing heat from the relatively less clean gas that is produced by the second layer.

6. A control system as recited in claim 1, wherein said first layer is physically bonded to said second layer.

7. A control system as recited in claim 6, wherein said first and second layers are of unitary one-piece construction.

8. A control system as recited in claim 7, wherein said body of solid propellant is cast in two layers.

9. A control system as recited in claim 7, wherein said body of solid propellant is pressed in two layers.

10. A control system, comprising:
    (a) gas generator means for defining a chamber in which to produce a quantity of hot gas with a solid propellant, said chamber having a forward portion and including means for defining an output port in gaseous communication with the forward portion;
    (b) ducting means for defining a ducting path in gaseous communication with said output port through which to convey said quantity of hot gas from said chamber for control purposes;
    (c) a body of solid propellant material disposed within the chamber, said body having a leading portion, an intermediate portion, and a trailing portion;
    (d) said body including a first layer that extends between the leading portion and the intermediate region, said first layer being composed of a first propellant composition that produces a relatively clean gas; and
    (e) said body including a second layer that extends between said intermediate region and said trailing portion, said second layer being composed of a second propellant composition that produces a relatively less clean gas.
    (f) said body of solid propellant material being arranged to burn within said chamber from said leading portion toward said trailing portion end and thereby produce a quantity of gas that passes through the output port to said ducting path; and
    (g) said first layer having a thickness sufficient to produce enough of said relatively clean gas to pre-heat said ducting structure and thereby reduce contaminant accumulation resulting from said ducting structure withdrawing heat from said relatively less clean gas that is produced by said second layer.

11. A propellant for use in a solid propellant gas generator of the type defining a chamber and an output port in gaseous communication with the chamber, the propellant comprising:
    (a) a body of solid propellant material dimensioned and arranged to fit within said chamber, said body having a leading portion, and intermediate portion, and a trailing portion, said propellant material being arranged to burn into gaseous form starting at said leading portion and ending at said trailing portion;
    (b) said body including a first layer extending from said leading portion to said intermediate region, said first layer being composed of a first propellant composition that produces a relatively clean gas; and
    (c) said body including a second layer extending from said intermediate region to said trailing portion, said second layer being composed of a second propellant composition that produces a relatively less clean gas.

12. A propellant as recited in claim 11, wherein said first layer is physically bonded to said second layer.

13. A propellant as recited in claim 11, wherein said first and second layers are of unitary one-piece construction.

14. A method of reducing contaminant accumulation on a hot gas ducting structure, comprising;
    exposing said ducting structure to a relatively clean gas for a length of time sufficient to pre-heat said ducting structure to a temperature at which contaminant accumulation is substantially prevented;
    exposing said ducting structure to a relatively less clean gas after said ducting structure has been pre-heated;
    the step of exposing said structure to a relatively clean gas and the step of exposing said structure to a relatively less clean gas including utilizing a multilayer body of propellant material to produce a relatively clean gas and conveying the same through said ducting structure until said ducting structure is pre-heated, and to produce a relatively less clean gas, and conveying the same through said ducting structure, after said ducting structure is pre-heated.

* * * * *